(12) United States Patent
Harper

(10) Patent No.: US 10,094,362 B1
(45) Date of Patent: Oct. 9, 2018

(54) COMPRESSED AIR/FLUID/GAS ENERGY METHOD

(71) Applicant: Jack R. Harper, Lake Wales, FL (US)

(72) Inventor: Jack R. Harper, Lake Wales, FL (US)

( * ) Notice: Subject to any disclaimer, the term of this patent is extended or adjusted under 35 U.S.C. 154(b) by 0 days.

(21) Appl. No.: 15/635,993

(22) Filed: Jun. 28, 2017

(51) Int. Cl.
| | | |
|---|---|---|
| *F02B 63/04* | (2006.01) | |
| *F03D 9/34* | (2016.01) | |
| *F03D 9/25* | (2016.01) | |
| *H02K 7/18* | (2006.01) | |

(52) U.S. Cl.
CPC .............. *F03D 9/34* (2016.05); *F03D 9/25* (2016.05); *H02K 7/1823* (2013.01); *H02K 7/1853* (2013.01)

(58) Field of Classification Search
CPC ........... F03D 9/25; F03D 9/34; H02K 7/1823; H02K 7/1853
See application file for complete search history.

(56) References Cited

U.S. PATENT DOCUMENTS

| | | | | |
|---|---|---|---|---|
| 4,130,064 A * | 12/1978 | Bridwell | ................. | F04B 17/00 104/154 |
| 6,091,159 A * | 7/2000 | Galich | ..................... | F03G 7/08 290/1 R |
| 6,376,925 B1 * | 4/2002 | Galich | ..................... | F03G 7/08 290/1 R |
| 7,148,581 B2 * | 12/2006 | Hershey | .................. | H02N 1/08 290/1 R |
| 8,661,806 B2 * | 3/2014 | Hendrickson | ............. | F03G 7/08 60/398 |
| 2004/0130158 A1 * | 7/2004 | Kenney | .................... | F04B 17/00 290/1 R |
| 2007/0085342 A1 * | 4/2007 | Horianopoulos | ......... | F03G 7/08 290/1 R |
| 2008/0150297 A1 * | 6/2008 | Shadwell | ............. | H02K 7/1853 290/1 R |
| 2008/0157537 A1 * | 7/2008 | Richard | ............... | H02K 7/1876 290/1 R |
| 2008/0224477 A1 * | 9/2008 | Kenney | ................... | F01D 17/26 290/1 R |
| 2010/0072758 A1 * | 3/2010 | Chang | .................. | H02K 7/1853 290/1 R |
| 2011/0215593 A1 * | 9/2011 | Chang | .................... | H02K 99/00 290/1 R |

(Continued)

*Primary Examiner* — Tulsidas C Patel
*Assistant Examiner* — Thomas Quigley

(57) ABSTRACT

A primary tube with input and output ends is positioned between wheels of a wheeled vehicle. The primary tube is adapted to be deformed in response to the passage of the wheeled vehicle. A secondary tube is operatively coupled with the primary tube. An air/fluid/gas collection tank is operatively coupled with the secondary tube and the output end of the primary tube thereby forming a closed loop path of travel within and through the primary and the secondary tubes and the air/fluid/gas collection tank. A mechanical device is located laterally spaced from the wheeled vehicle in operative proximity to the air/fluid/gas collection tank. A power tube couples the mechanical device and the air/fluid/gas collection tank. The mechanical device is a mechanical conversion device chosen from the class of mechanical conversion devices consisting of turbines, generators and alternators. The wheeled vehicle is moved over the primary tube.

3 Claims, 5 Drawing Sheets

(56) References Cited

U.S. PATENT DOCUMENTS

2012/0321383 A1* 12/2012 Sieger ................. E01O 5/00
                                                                404/71
2015/0211498 A1*  7/2015 Alvino ................. F03G 7/08
                                                                290/1 R

* cited by examiner

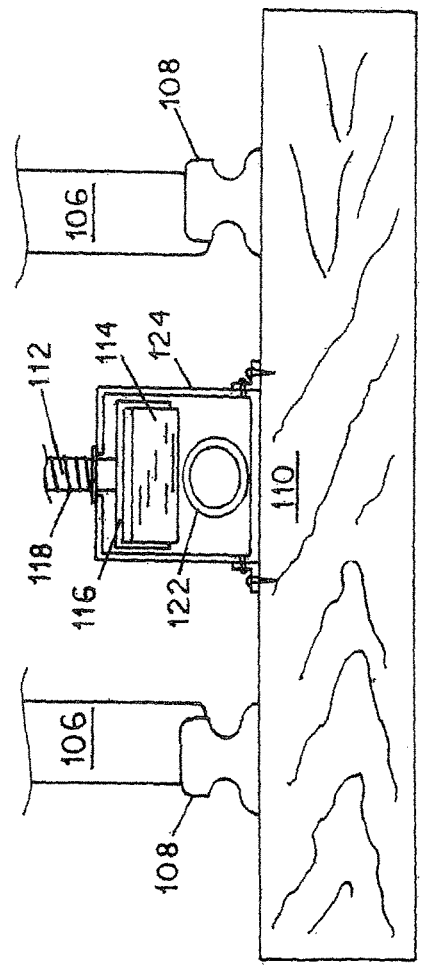
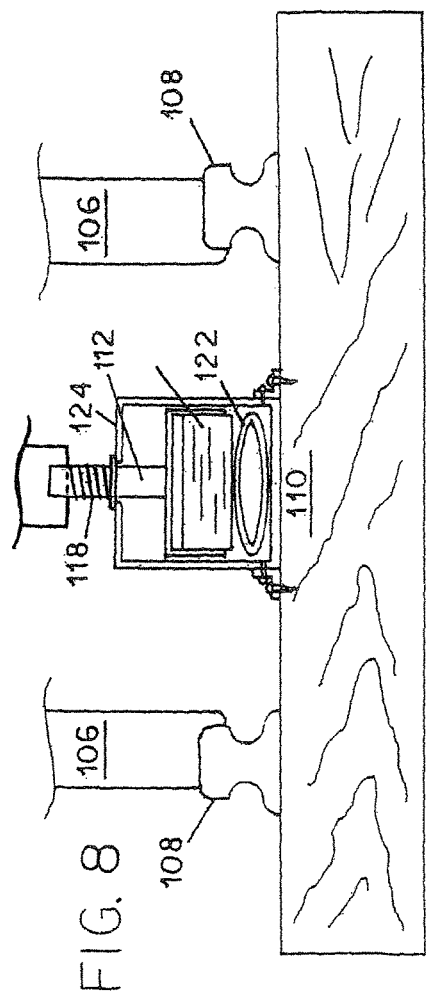

COMPRESSED AIR/FLUID/GAS ENERGY METHOD

BACKGROUND OF THE INVENTION

Field of the Invention

The present invention relates to a compressed air/fluid/gas energy method and more particularly pertains to creating continuous air/fluid/gas flows in response to vehicles moving there over and converting such air/fluid/gas flows into electrical energy, the creating and converting being done in a safe, ecologically preferred, convenient and economical manner.

SUMMARY OF THE INVENTION

In view of the disadvantages inherent in the known types of generator methods of known designs and configurations now present in the prior art, the present invention provides an improved compressed air/fluid/gas energy method. As such, the general purpose of the present invention, which will be described subsequently in greater detail, is to provide a new and improved compressed air/fluid/gas energy method which has all of the advantages of the prior art and none of the disadvantages.

To attain this, the present invention essentially comprises a compressed air/fluid/gas energy method. The method consists of a plurality of steps. The first step is providing a primary tube with input and output ends positioned between wheels of a wheeled vehicle. The primary tube is adapted to be deformed in response to the passage of the wheeled vehicle. A secondary tube is operatively coupled with the primary tube. An air/fluid/gas collection tank is operatively coupled with the secondary tube and the output end of the primary tube thereby forming a closed loop path of travel within and through the primary and the secondary tubes and the air/fluid/gas collection tank. A mechanical device is located laterally spaced from the wheeled vehicle in operative proximity to the air/fluid/gas collection tank. A power tube couples the mechanical device and the air/fluid/gas collection tank. The mechanical device is a mechanical conversion device chosen from the class of mechanical conversion devices consisting of turbines, generators and alternators. The final step is moving the wheeled vehicle over the primary tube.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the disclosure attached.

In this respect, before explaining plural embodiments of the invention in detail, it is to be understood that the invention is not limited in its application to the details of steps and construction and to the arrangements of the steps and components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and methods for carrying out the several purposes of the present invention. It is important, therefore, that the disclosure be regarded as including such equivalent method steps and constructions insofar as they do not depart from the spirit and scope of the present invention.

It is therefore an object of the present invention to provide a new and improved compressed air/fluid/gas energy method which has all of the advantages of the prior art generator methods of known designs and configurations and none of the disadvantages.

It is another object of the present invention to provide a new and improved compressed air/fluid/gas energy method which may be easily and efficiently manufactured and marketed.

It is further object of the present invention to provide a new and improved compressed air/fluid/gas energy method which is of durable and reliable constructions.

An even further object of the present invention is to provide a new and improved compressed air/fluid/gas energy method which is susceptible of a low cost of manufacture with regard to both materials and labor, and which accordingly is then susceptible of low prices of sale, thereby making such compressed air/fluid/gas energy method economically available.

Even still another object of the present invention is to provide a compressed air/fluid/gas energy method for creating continuous air/fluid/gas flows in response to vehicles moving there over and converting such air/fluid/gas flows into electrical energy, the creating and converting being done in a safe, ecologically preferred, convenient and economical manner.

Lastly, it is an object of the present invention to provide a new and improved compressed air/fluid/gas/fluid/gas energy method for creating continuous air/fluid/gas flows in response to vehicles moving there over and converting such air/fluid/gas flows into electrical energy, the creating and converting being done in a safe, ecologically preferred, convenient and economical manner.

These together with other objects of the invention, along with the various features of novelty which characterize the invention, are pointed out with particularity in this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 7 and 8 are cross sectional views of the rails and primary tube of FIG. 6, FIG. 7 with the roller raised above the primary tube, FIG. 8 with the roller in operative contact with the primary tube.

The same reference numerals refer to the same parts throughout the various Figures.

DESCRIPTION OF THE PREFERRED EMBODIMENT

Figure 1:
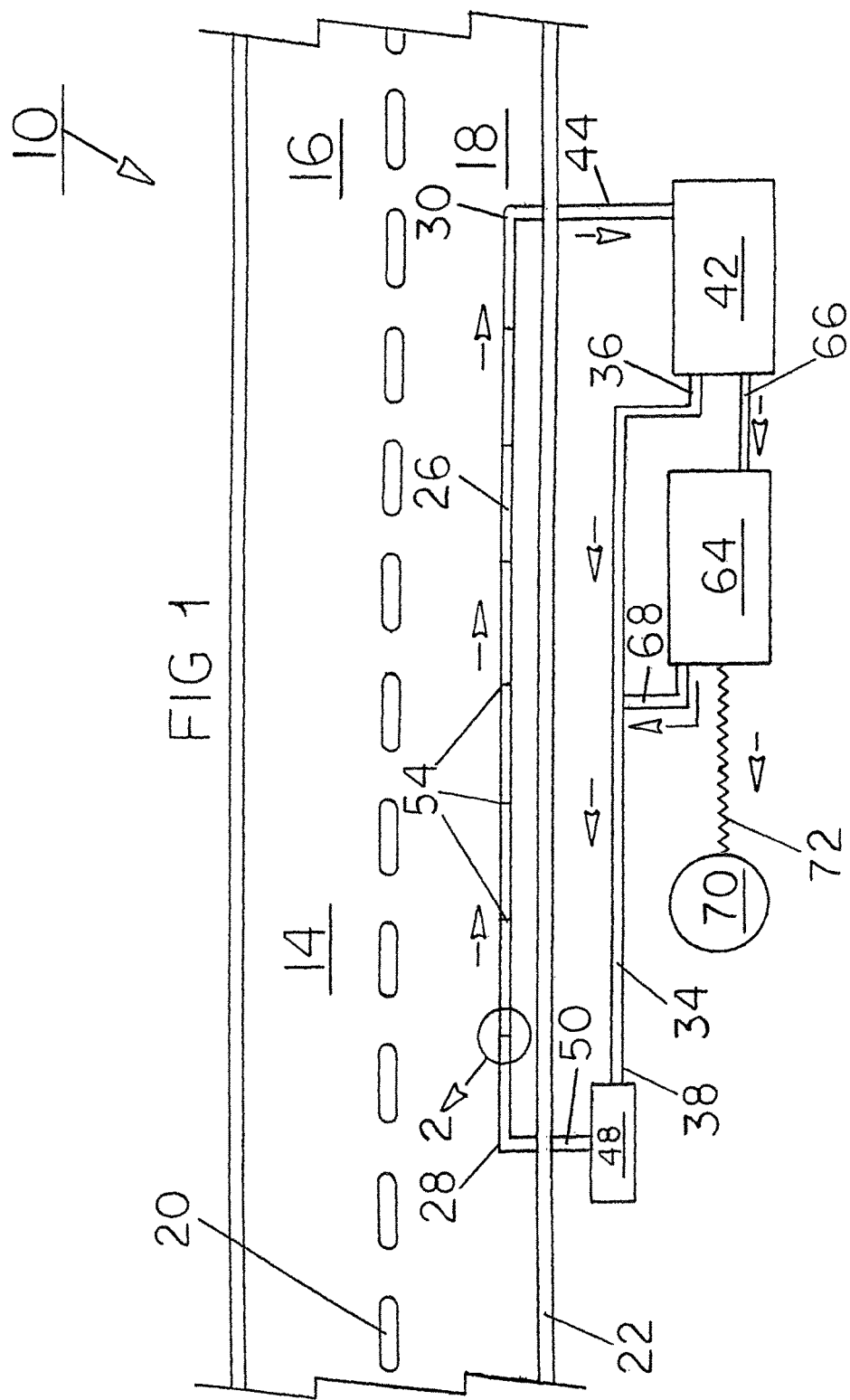
FIG. 1 is a plan view of a compressed air/fluid/gas energy method constructed in accordance with the principles of the present invention.
Figure 2:
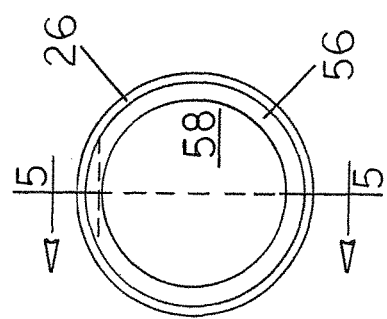
FIG. 2 is an enlarged plan view, partly in cross section, taken at Circle 2 of FIG. 1.
Figure 3:
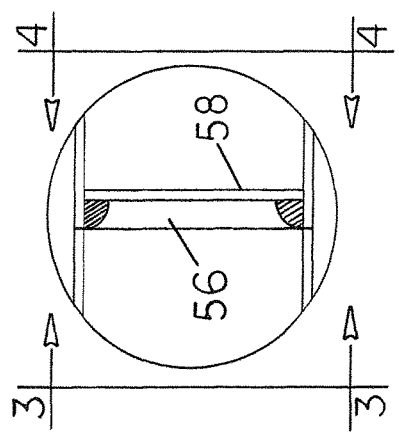
FIGS. 3 and 4 are cross sectional views taken along lines 3-3 and 4-4 of FIG. 2.
Figure 4:
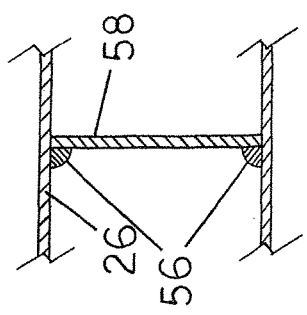
Figure 5:
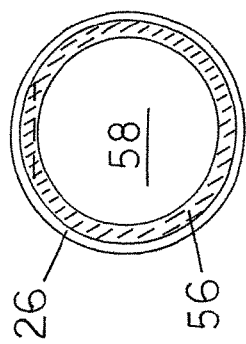
FIG. 5 is a cross sectional view taken along line 5-5 of FIG. 3.

With reference now to the drawings, and in particular to FIG. 1 thereof, the preferred embodiment of the new and improved generator method embodying the principles and concepts of the present invention and generally designated by the reference numeral 10 will be described.

The first embodiment of the present invention is a method 10 comprised of a plurality of steps. Such steps in their broadest context include providing a primary tube, a secondary tube, an air/fluid/gas collection tank and a mechanical device. The final step is moving a vehicle over the primary tube. Such steps are individually configured and correlated with respect to each other so as to attain the desired objective.

First provided is a highway 14. The highway has a driving surface. The driving surface has a plurality of parallel lanes 16, 18. The plurality of lanes is adapted to receive and support vehicles with wheels traveling in opposite directions. The wheeled vehicle is not shown. The lanes are separated by a centerline 20. The driving surface of at least one lane constitutes a monitored lane 18. The monitored lane has a lateral edge 22. The lateral edge is spaced from and essentially parallel with the centerline.

A primary tube 26 is provided. The primary tube has an extended length. The length of the tube is positioned upon the monitored lane. The primary tube has an input end 28. The primary tube has an output end 30. The primary tube has an interior surface and an exterior surface. The primary tube is located essentially parallel with the lateral edge and the centerline. The primary tube is located closer to the lateral edge than to the centerline. In this manner the wheels of a vehicle driving along the monitored lane will drive along and contact the primary tube in a continuous manner. The primary tube is fabricated of an elastomeric material with high resilience chosen from the class consisting of polyacrylate rubber, polyester urethane, polybutadiene, and polyurethane.

A secondary tube 34 is provided. The secondary tube has an extended length. The length of the tube is positioned adjacent to but offset from the driving surface. The secondary tube has an input end 36. The input end of the secondary tube is positioned adjacent to the output end of the primary tube. The secondary tube has an output end 38. The output end of the secondary tube is positioned adjacent to the input end of the primary tube. The secondary tube is located essentially parallel with the primary tube.

An air/fluid/gas collection tank 42 is provided. The air/fluid/gas collection tank is operatively coupled with the input end of the secondary tube. An initial cross tube 44 is provided. The initial cross tube connects the air/fluid/gas collection tank with the output end of the primary tube.

A low pressure tank 48 is provided. The low pressure tank is operatively coupled with the output end of the secondary tube. A supplemental cross tube 50 is provided. The supplemental cross tube connects the low pressure tank with the input end of the primary tube.

A closed loop path of travel is formed. In this manner air/fluid/gas may move within and through the primary tube, the initial cross tube, the air/fluid/gas collection tank, the secondary tube, the low pressure tank and the supplemental cross tube. The closed loop path is adapted to convey air/fluid/gas within the closed loop path as the wheels of a vehicle move along the primary tube.

A plurality of one-way valves 54 is provided next. The valves are located at axially spaced locations in the primary tube. Each one-way valve includes an annular ring 56. The ring has a central opening. The ring has a peripheral edge. A first adhesive is provided. The first adhesive attaches the periphery to the interior surface of the primary tube. Each one-way valve also includes an imperforate circular flapper 58. A second adhesive is provided. The second adhesive attaches the flapper to the annular ring at an upper extent of the annular ring and the flapper. Each flapper is in facing contact with an associated ring. The flapper is provided closer to the output end of the primary tube than to the input end. In this manner a reverse flow of air/fluid/gas is abated when no wheel is in contact with the primary tube. Also in this manner an intended flow of air/fluid/gas is achieved when the wheel of a vehicle moves along and in driving contact with the primary tube with the flappers moving away from the rings.

Further provided is a mechanical device 64. The mechanical device is located laterally spaced from the highway. The mechanical device is provided in operative proximity to the air/fluid/gas collection tank. A power tube 66 is provided. The power tube couples the mechanical device and the air/fluid/gas collection tank. In this manner movement of air/fluid/gas in the tubing caused by vehicles moving along the primary tube will convert mechanical energy into electrical energy at the mechanical device. The mechanical device is a mechanical conversion device. The mechanical conversion device is chosen from the class of mechanical conversion devices. The class of mechanical conversion devices consists of turbines, generators and alternators. A return tube 68 is provided. The return tube couples the mechanical device to the secondary tube. In this manner air/fluid/gas may circulate.

Provided last is an electrical device 70. The electrical device is operatively coupled to the mechanical device. An electric line 72 is provided. The electric line couples the electric device and the mechanical device. The electrical device is an electrical utilization device. The electrical utilization device is chosen from the class of electrical utilization devices. The class of electrical utilization devices consists of electrical appliances, electrical storage devices and grids.

Figure 6:
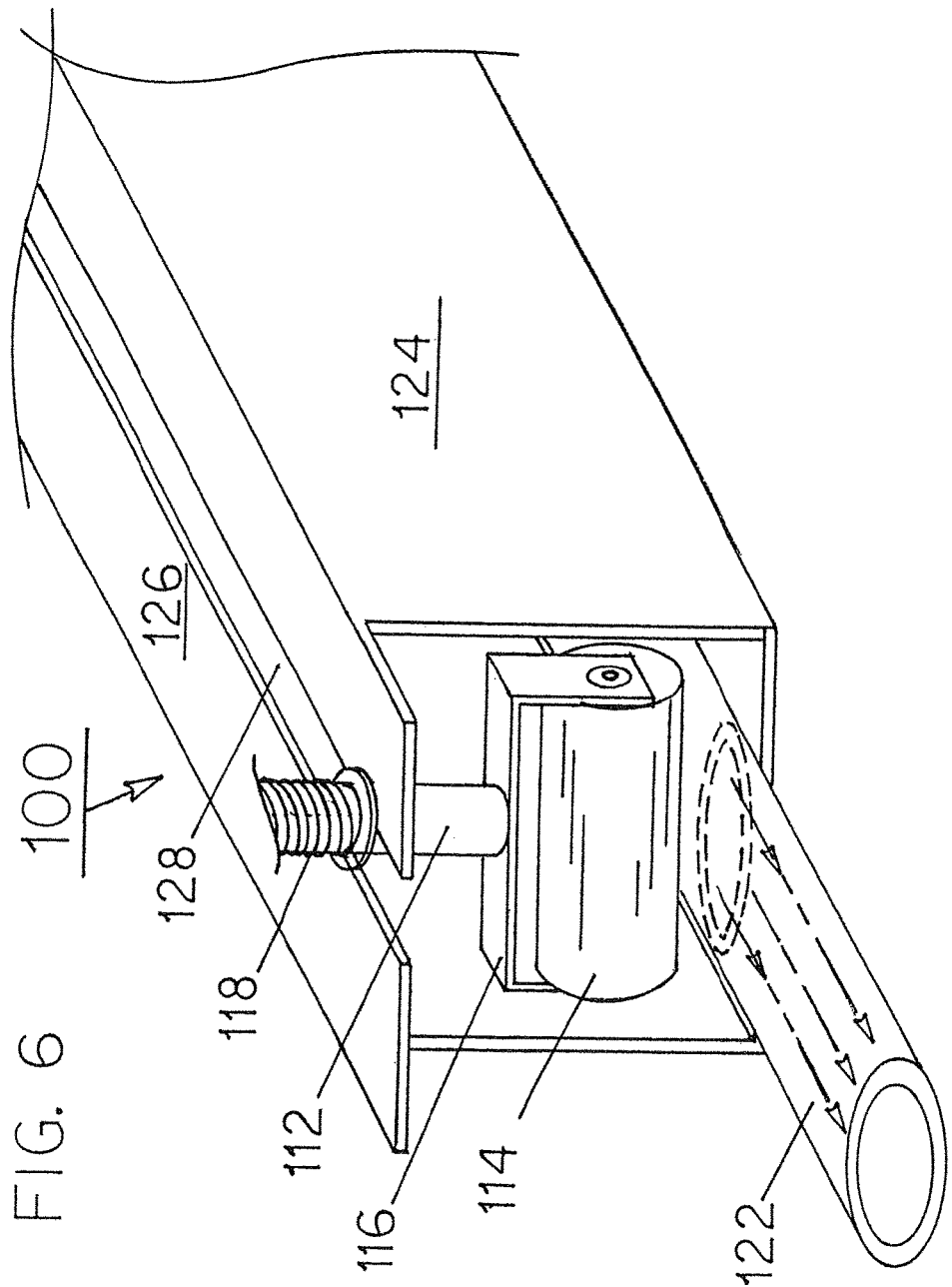
FIGS. 6, 6a, and 6b are perspective illustrations of the primary embodiment of the invention.
Figure 6A:
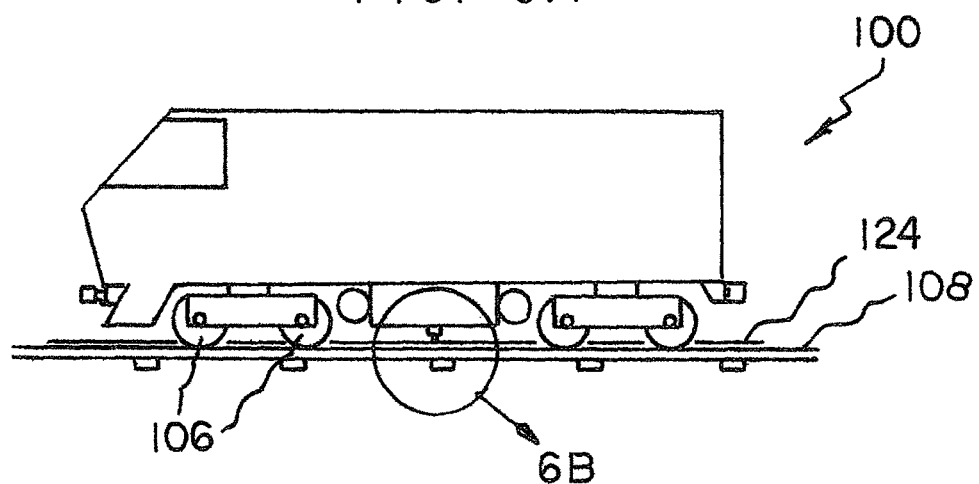
Figure 6B:
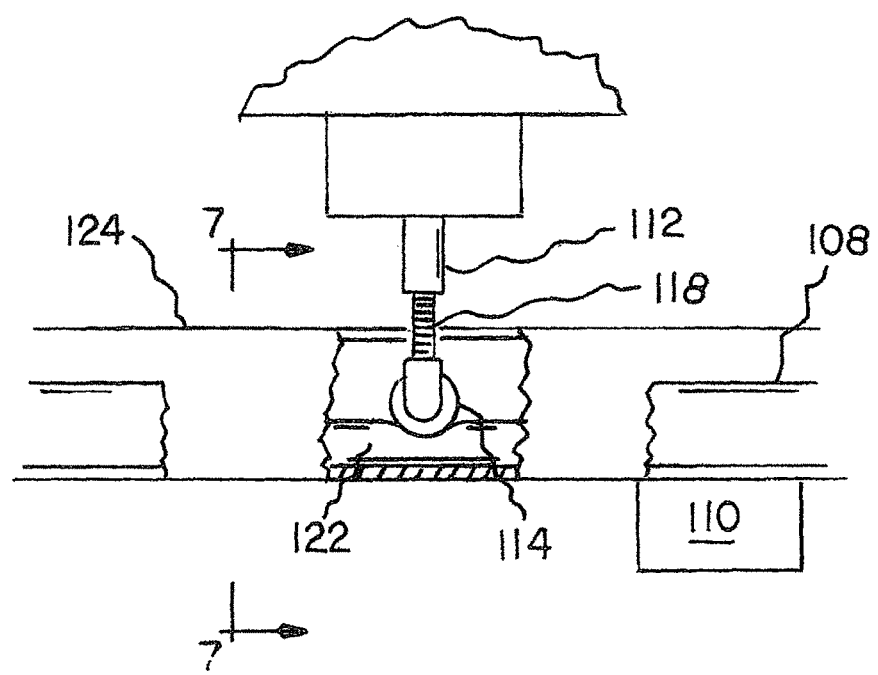

Another embodiment of the invention is illustrated in FIGS. 6 through 8. In such embodiment, the vehicle rides on rails rather than on a roadway while the means to compress the tube is a roller depending from the vehicle rather than the wheels of the vehicle.

More specifically, the method 100 includes providing a vehicle having laterally spaced wheels 106 with a space between the wheels. The wheels ride on fixed rails 106 supported on transverse ties 108. The vehicle is preferably a train, but may be a trolley or like wheel/rail vehicle.

Depending downwardly from the space between the wheels, preferably equally spaced between the wheels, is a support cylinder 112. The support cylinder receives a roller 114 on a clevis 116. The roller is adapted to rotate in response to moving contact along a recipient surface beneath the roller while the vehicle moves the roller along the recipient surface. The support tube is at a rearward acute angle with respect to the recipient surface and the rails. The weight of the tube and the roller under the influence of gravity insures effective rolling contact between the roller and the recipient surface. A mechanical force generator, preferably in the form of a pressure member 118 is adapted to supplement gravity to further insure good rolling contact between the roller and the recipient surface. A wide variety of pressure members could be readily utilized such as a coil spring or a hydraulic cylinder or the like.

The recipient surface for the roller is a primary tube 122 for moving air/fluid/gas to generate electricity as described above. Proper positioning of the primary tube beneath the roller is maintained through an elongated housing 124. Such housing is rectangular in configuration with the primary tube 122 above and the roller 114 above. The housing has an upper surface 126 with an axial slot 128 for the passage of the support cylinder 112. The housing is supported upon an attached to the ties which also support the rails.

A secondary tube 34 is provided. The secondary tube for this preferred embodiment is essentially the same in structure and in function as the secondary tube of the first embodiment as described above and as illustrated in FIGS. 1-8. Also provided, and as the same as in the first embodiment, are the air/fluid/gas collection tank 42, initial cross tube 44, low pressure tank 48, supplemental cross tube 50. Such components create a closed loop path of travel for air/fluid/gas being moved. Further provided, and as the same as in the first embodiment, are the plurality of one-way valves 54, an annular ring 56, imperforate circular flappers 58, a mechanical device 64 located laterally spaced from the railway in operative proximity to the air/fluid/gas collection tank. A power tube 66 couples the mechanical device and the air/fluid/gas collection tank. In this manner movement of air/fluid/gas in the tubing caused by vehicles moving along the primary tube will convert mechanical energy into electrical energy at the mechanical device.

The mechanical device is a mechanical conversion device chosen from the class of mechanical conversion devices consisting of turbines, generators and alternators. A return tube 68 couples the mechanical device to the secondary tube. In this manner air/fluid/gas may circulate.

Provided last is an electrical device 70. The electrical device is operatively coupled to the mechanical device by an electric line 72. The electrical device is an electrical utilization device chosen from the class of electrical utilization devices consisting of electrical appliances, electrical storage devices and grids.

The final method step is moving vehicles over the primary tube to create a flow of air/fluid/gas through the secondary tube, air/fluid/gas collection tank, low pressure tank, plurality of one way valves, and power tube to power to mechanical device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as being new and desired to be protected by Letters Patent of the United States is as follows:

1. An energy conversion method comprising the steps of:
providing a railway having a driving surface formed of two laterally spaced parallel rails, the railway also including a vehicle with wheels, the wheels being supported by the rails, a roller attached to the bottom of the vehicle, the rails being separated by a centerline;
providing a primary tube with input and output ends positioned between wheels of the vehicle, the primary tube adapted to be deformed in response to the passage of the vehicle;
providing a fluid collection tank operatively coupled with the output end of the primary tube thereby forming a path of travel within and through the primary tube and the fluid collection tank, an initial cross tube connecting the fluid collection tank with the output end of the primary tube;
providing a plurality of one way valves at axially spaced locations within the primary tube;
providing a mechanical device located laterally spaced from the rails in operative proximity to the fluid collection tank, a power tube coupling the mechanical device and the fluid collection tank, transforming mechanical power produced by the mechanical device into electrical power; and
wherein moving the vehicle over the primary tube causes the roller to come in contact with the primary tube, thereby causing the primary tube to deform and to create a flow of fluid into and through the primary tube, into and through the fluid collection tank, to power the mechanical device.

2. The method as set forth in claim 1 and including the additional step of:
providing an electrical device operatively coupled by way of an electric line to the mechanical device, the electrical device being an electrical utilization device chosen from the class of electrical utilization devices consisting of electrical appliances, electrical storage devices and grids.

3. The method as set forth in claim 1 wherein the primary tube is fabricated of an elastomeric material with high resilience chosen from the class consisting of polyacrylate rubber, polyester urethane, polybutadiene, and polyurethane.

* * * * *